United States Patent Office 3,330,679
Patented July 11, 1967

3,330,679
CARBON BLACK PROCESS
Merrill E. Jordan and Harvey M. Cole, Walpole, William G. Burbine, Whitman, and David I. Petterson, Wollaston, Mass., assignors to Cabot Corporation, Boston, Mass., a corporation of Delaware
No Drawing. Filed Aug. 9, 1961, Ser. No. 130,248
5 Claims. (Cl. 106—307)

This invention relates to the production of carbon black and in particular to an improved method of producing desirable carbon black products.

Commercially carbon black is produced by the thermal decomposition of carbon containing materials which are essentially hydrocarbon in nature. The thermal decomposition of the carbonaceous material can be achieved by various processes such as open flame decomposition (impingement or channel), enclosed direct flame decomposition (furnace), stored heat decomposition (cyclical thermal furnace), externally heated surfaces (continuous thermal) or detonation or internal combustion processes (engine or energy utilizing systems) etc. The basic properties of a black and therefore the performance characteristics exhibited thereby in the applications thereof are determined in larger measure by the particular process by which it is produced. For example, channel blacks are generally characterized by high surface area, low structure, high volatile content and low pH, and are particularly suitable for use as coloring agents, and as reinforcing agents in rubber. A carbon black produced by the furnace process on the other hand, may be produced over a wide range of closely controlled particle sizes and accordingly is adaptable as a filler for various synthetic rubbers and plastics. Also, variations in the fuels and reaction conditions used in the above processes can influence the properties of the black produced. Such essentially is the present degree of flexibility of variables involved in the production of carbon black and these although limited, nevertheless permit the production of the many types of carbon black now being utilized in a wide and ever expanding variety of commercial applications.

Despite the fact that, by utilizing and manipulating the variables mentioned above, the properties of a produced black may be varied and reasonably predicted or controlled, there are still intrinsic variables e.g. changes in the quality of the raw material, which render difficult the precise day to day control of the ultimate properties of the final product produced. This is especially true when a carbon black is produced for some specific application and must consistently, uniformly and within very narrow tolerances impart a certain property or set of properties to the products in which it is used. Accordingly, it would be most desirable and valuable to have simple, independent methods of controlling and adjusting the properties of the carbon black products so as to permit the uniform controlled production consistently of an ultimate desired product of predetermined properties or a product having certain properties precisely and selectively modified.

The fundamental object of the present invention is to provide a novel process for adjusting and controlling the properties of a carbon black to meet prescribed and predetermined requirements.

Another object of the present invention is to provide a novel and simple process for producing, in increased yields, a carbon black of uniform and predetermined quality.

A further object of the present invention is to provide a simple process for compensating for variables in hydrocarbon raw materials so as to avoid serious deviations in quality of the black produced.

Still another object of the present invention is to provide a process whereby a desirable carbon black may be produced which consistently and within very narrow tolerances exhibits predetermined properties.

Still other objects and advantages of the present invention will be in part be obvious and will in part appear hereinafter.

We have discovered a simple yet very effective process for producing carbon blacks of such prescribed and selectively predetermined properties. In accordance with our invention the above objects and advantages are realized by introducing into the reaction zone in which the black is being formed from the make hydrocarbon, a minor amount of a substance comprising the element tin.

The exact amount of a particular tin-containing substance used in accordance with the teachings of the present invention will depend upon the nature of the particular carbon forming reaction involved and upon the degree of adjustment desired in the properties of the final carbon black product.

Although the addition of less than 250 parts by weight of additive calculated as tin per million parts of make fuel may effect slight changes in the resultant black which are significant for quality control purposes, we have found that the use of such amounts evidently do not effect any major changes in the black properties. However, above concentrations of 500 parts of additive calculated as tin per million, the increased effect on the properties of the resulting black appears to be a function of the amount of additive utilized. Also, we have found that the amount of the additive element (tin) which remains associated with the finished black is, for a given process and method of addition, largely a function of the concentration of additive utilized but is usually only a small fraction of the total amount added. In general the amount of additive which remains associated with the black will vary from about 100 to about 200,000 parts of additive per million parts of carbon. Accordingly, one can effectively utilize the process disclosed in this invention to produce blacks containing varying amounts of tin. Such discoveries indicate that the upper limit of the amount of the particular additive utilized in accordance with the teachings of the present invention will be dictated by the ultimate properties desired in the final carbon black e.g. ultimate structural properties and/or ultimate tin content thereof. However, from a practical and economical viewpoint, that is, in order to avoid the use of special and costly equipment, or modification of the normal flame configurations or modification of the combustion zones, etc. we have found that it would not be desirable to operate with an amount of additive sufficient to supply above about 300,000 parts by weight of tin per million parts by weight of make fuel. Accordingly, although the amount of additive utilized in accordance with the teachings of this invention may, for some limited purposes, cover amounts up to about 250,000 parts of tin, or even higher, nevertheless the preferred embodiment of the present invention contemplates the use of from about 800 parts to about 150,000 parts tin per million parts of make fuel.

The resulting blacks obtained in accordance with the teachings of the present disclosure possess many unusual and desirable properties. For example, significant changes in particle size and arrangement such as the so called "structure" properties of the resulting black can be effected. The extent of these changes in the ultimate properties of a so produced black, as reflected by measurements of the oil absorption and nigrometer scale thereof, for example, are determined by the particular tin compound utilized and by the concentration thereof for any particular type of process. The scale of a carbon black as determined by a nigrometer reading is an indication of the masstone or jetness of a black wherein the intensity of the jetness of blackness thereof is an inverse function of the nigrometer scale reading. Also the nigrometer scale of a black is a rapid method of determining the relative particle size of a carbon black wherein the particle size thereof generally varies directly with the scale thereof. The oil absorption of a carbon black is a measure of the oil demand of a black and therefore, a relative measure of its "structure." It is a good general indication of the relative viscosity of many ink and paint systems which utilize carbon black wherein a lower oil absorption generally implies a lower relative viscosity. Also in some rubber black systems the oil absorption of the black is a general indication of the modulus level which the black will impart to a given rubber at a given loading. Accordingly, by utilizing the teachings of our invention one may either consistently and uniformly produce from a wider variety of fuels a given quality of black or, without affecting major changes in the features of the production process, obtain from a given type of fuel a wider than normal variety of useful carbon blacks having desirable predetermined properties for applications in the fields of inks, paints, plastics, rubber, etc.

In addition to the controlled production of blacks having the aforementioned predetermined properties our process may also be utilized to produce a carbon black having varying amounts of tin intimately combined therewith. By introducing the additive compound to the reaction or conversion zone wherein the carbon black exists at its inception as an active radical, that is by having the additive present while the black is being created and exists in its "status nascendi," the additive has an opportunity to become intimately admixed or associated with the finished black product. Such carbon blacks may be reacted with a wide variety of compounds such as hydroxides, ammonias, amines, cyanides, various organic compounds, etc. to form carbon black derivatives by transposition. The resulting carbon black derivatives find a wide range of applications in the fields of rubbers, plastics, lacquers, inks, paints, dyes, etc. Accordingly, by utilizing the teachings of this invention a carbon black may be produced which instead of being inert, is capable of reaction with other compounds to thereby produce various desirable carbon black derivatives.

Broadly, the additives contemplated within the scope of the present invention are tin and any of its compounds. However, the preferred additives are those tin compounds which are soluble, or dispersable or suspendable in a carrier such as water, aqueous media, or organic media including the hydrocarbon raw materials from which the black is being made or in the vapors or gases which are ordinarily added to the carbon conversion zone. More particularly, we strongly prefer the water soluble compounds of tin. Accordingly, examples of the preferred compounds of our invention are the various inorganic salts of tin such as the chlorides, sulfates, carbonates, etc. Other compounds of tin which are particularly suitable for the purposes of the present invention are the various complexes and metallo organics thereof such as its salts of organic acids. The control over the amount of the additive compound introduced to the reaction zone either alone or admixed with the make fuel or with the oxidizing media may be readily achieved by any of the metering or regulating systems or the like well known to the art.

Hereinafter, follow a number of non-limiting, illustrative examples. Unless otherwise specified, the properties of the carbon blacks listed in the examples were determined as follows:

*Nigrometer scale.*—The nigrometer scale of a carbon black is determined by utilizing an instrument as described in U.S. Patent 1,780,231. The instrument is used to measure the intensity of the blackness of a paste made by mixing 0.25 gram of the black being tested in 3 cc. of No. 5201 Morrill linseed varnish.

*Oil absorption.*—The oil absorption procedure used is substantially the same as other such procedures used throughout the carbon black and rubber industries. It involves the stiff paste oil absorption technique in which one gram of carbon black is mixed with alkali refined linseed oil until a point is reached at which the mixture coheres in a rounded mass. This procedure is generally known as the Gardner method and results are reported in terms of pounds of oil required to wet 100 pounds of black.

*Diphenylguanidine absorption test (DPG).*—The DPG test involves the shaking of 1 gram of the black tested for 30 minutes with 100 milliliters of 0.001 N diphenylguanidine in benzene. The black is then allowed to settle and an aliquot portion of the supernatant solution is titrated with 0.002 N alcoholic hydrochloric acid, using bromophenol blue as indicator. A blank solution is run and results reported in percent diphenylguanidine removed from solution.

*Example 1*

Carbon black was produced by the furnace process in an experimental furnace wherein acetylene was used as raw material. The experimental furnace was equipped with a burner composed of 3 separate concentric annular tubes the upper openings of which converge at the burner tip. Acetylene was conducted through the outer annular space to the burner tip and thence to the conversion zone while the oxidizing media (air) was conducted through the adjacent inner annular space. The innermost of the aforementioned concentric annular spaces in the burner consists of a capillary tube through which solutions of a tin compound of varying concentrations were added to the conversion zone at a constant rate of about 1 cc. per minute. The delivery of the solution of the tin compound to the conversion zone was accomplished by means of a "Zero-Max" variable speed torque convertor which was produced by Revco Inc. The properties of the resulting furnace carbon blacks were measured and the following results were obtained.

TABLE 1

| Run # | Fuel | Additive | Parts tin per million parts of make fuel | Scale | Oil Absorption # oil per 100# blk. | Percent Sn by weight in product |
|---|---|---|---|---|---|---|
| Control | $C_2H_2$ | None | None | 84.5 | 170 | None |
| 4-360 | $C_2H_2$ | $SnCl_2 \cdot 2H_2O$ | 820 | 84.5 | 161 | 0.4 |
| 4-362 | $C_2H_2$ | $SnCl_2 \cdot 2H_2O$ | 14,700 | 84.2 | 152 | 1.21 |
| 4-365 | $C_2H_2$ | $SnSO_4$ | 32,500 | 84.2 | 158 | ---------- |
| 4-367 | $C_2H_2$ | $SnC_4H_4O_6$ | 59,300 | 84.4 | 157 | 3.78 |
| 4-369 | $C_2H_2$ | $SnCrO_4$ | 63,100 | 84.3 | 155 | ---------- |
| 4-364 | $C_2H_2$ | $SnCl_2 \cdot 2H_2O$ | 76,400 | 83.3 | 141 | 6.22 |

It is obvious from the above data that relatively minor amounts of the additive such as about 800 parts thereof as tin per million parts of make fuel effect significant changes in the "structure" properties of the resulting black. Also the data indicates that those properties effected such as the scale and oil absorption are progressively affected as the concentration of additive in the conversion zone increases.

*Example 2*

Substantially the same procedure as in Example 1 was followed except that in Run 4-354 (below) a 2.5 molar solution of $SnCl_2 \cdot 2H_2O$ was added to the conversion zone at a constant rate of about 100 milliliters per hour while in Run 4–342 (below) a 4.4 molar solution of $SnCl_2 \cdot 2H_2O$ was added to the conversion zone at a constant rate of about 120 milliliters per hour. The following property data were obtained.

TABLE 2

| Run # | Fuel | Parts of Tin Per Million parts of fuel | Yield Percent of Total C in $C_2H_2$ | DPG | Oil Absorption # oil per 100 # blk. | Scale | $N_2$ Surface area, m.²/gm. | Percent Ash |
|---|---|---|---|---|---|---|---|---|
| 4–355 | $C_2H_2$ | None | 24.1 | 21 | 169 | 84.2 | 96.5 | 0.03 |
| 4–354 | $C_2H_2$ | 115,400 | 43.5 | 68 | 108 | 83.5 | 122.9 | 22.0 |
| 4–342 | $C_2H_2$ | 215,700 | 67.5 |  | 68 | 82.5 |  |  |

The above data illustrates the wide range of properties of resulting carbon blacks available which may be obtained from a given fuel by utilizing the teachings of the present invention. Moreover, it should be noted that the DPG, which is the measure of the curing speed of a particular carbon black, may also be controlled or selectively predetermined by the teachings of our invention.

The carbon blacks from Runs 4–355 (control) and 4–354 were washed with water 6 times and dried in order to remove any excess or loosely attached soluble salts. Each of the so washed blacks were then compounded with a natural rubber in identical manners and cured to an equivalent state.

The following data were obtained:

| Black # | Tensile strength, p.s.i. | Modulus, 400% | Elongation (%) | Shore A² Hardness | Tensile Product |
|---|---|---|---|---|---|
| 4–355 (control) | 3,630 | 2,390 | 550 | 65 | 1.73×10⁶ |
| 4–354 | 3,380 | 1,240 | 690 | 53 | 2.29×10⁶ |

The above data indicate that the teachings of the present invention may be utilized to also produce vulcanizates or other ultimate carbon black-containing products modified to conform to a wide variety of predetermined specifications.

Since the essence of our invention resides in the deliberate addition of varying amounts of an additive comprising tin to carbon conversion zones obviously many incidental modifications in operational techniques and apparatus designs may be utilized without departing from the scope of our invention. Accordingly, various modifications such as combustion zone design, method of introducing additive, and other modifications obvious to those well skilled in the art are contemplated by our invention. Also, substantially smaller amounts of the additive may be utilized without departing from the scope of our invention. Smaller amounts, e.g. amounts of about 500 parts or less of the additive as tin per million parts of make fuel, may be used when the teachings of our invention are utilized to compensate for the minor uncontrollable variables inherent in the many production processes for carbon black.

Having described our invention, what we claim as new and desire to secure by U.S. Letters Patent is:

1. In the process for producing carbon black wherein an essentially hydrocarbon raw material is decomposed in a conversion zone with the aid of a molecular oxygen supported combustion reaction proceeding simultaneously within said zone, the improvement which permits selective control of the properties of the black produced in said zone including those properties of said black which are reflected by the scale and oil absorption measurements thereof, which comprises simultaneously supplying to said conversion zone an additive, the essential ingredient of which is tin in an amount sufficient to provide to said zone from at least about 250 parts to about 250,000 parts of tin per million parts by weight of make fuel, the proportion of said additive introduced to said zone being directly related to the degree of adjustment desired in the properties of said carbon black.

2. The process of claim 1 wherein the amount of said additive is sufficient to provide to said zone from at least about 800 parts to about 150,000 parts of tin per million parts by weight of make fuel.

3. The process of claim 1 wherein said additive is supplied to said zone in the form of a water soluble compound of tin.

4. In the process for producing carbon black wherein an essentially hydrocarbon raw material is decomposed in a conversion zone maintained at free carbon forming conditions, the improvement which permits selective control of the properties of the black produced in said zone including those properties of said black which are reflected by the scale and oil absorption measurements thereof, which comprises simultaneously supplying to said conversion zone a water soluble tin compound in an amount sufficient to provide to said zone between about 250 and about 250,000 parts of tin per million parts by weight of make fuel, the proportion of said compound introduced to said zone being directly related to the degree of adjustment desired in the properties of said carbon black.

5. In the process for producing carbon black wherein an essentially hydrocarbon raw material is decomposed in a conversion zone with the aid of a molecular oxygen supported combustion reaction proceeding simultaneously within said zone, the improvement which permits selective control of the properties of the black produced in said zone comprising simultaneously supplying to said zone an additive, the essential ingredient of which is tin, in a small but effective amount sufficient to modify the properties of the carbon black produced.

References Cited

UNITED STATES PATENTS

| | | | |
|---|---|---|---|
| 1,999,573 | 4/1930 | Odell | 106—307 |
| 2,258,438 | 10/1941 | Barton | 106—307 |
| 2,760,847 | 8/1956 | Oblad et al. | 23—209.5 |
| 3,010,794 | 11/1961 | Friauf et al. | 106—307 |

OSCAR R. VERTIZ, *Primary Examiner.*

JOHN H. MACK, MAURICE A. BRINDISI, TOBIAS LEVOW, *Examiners.*

A. LIEBERMAN, A. J. STEWART, J. POER, E. J. MEROS, *Assistant Examiners.*